L. J. CEREGHINO.
COMBINED FLYTRAP AND GARBAGE CAN.
APPLICATION FILED DEC. 4, 1916.

1,350,402.

Patented Aug. 24, 1920.
2 SHEETS—SHEET 1.

INVENTOR
Louis Joseph Cereghino
BY
Harry C. Schroeder
ATTORNEY

L. J. CEREGHINO.
COMBINED FLYTRAP AND GARBAGE CAN.
APPLICATION FILED DEC. 4, 1916.

1,350,402.

Patented Aug. 24, 1920.
2 SHEETS—SHEET 2.

INVENTOR
Louis Joseph Cereghino
BY
Harry Schroeder
ATTORNEY

UNITED STATES PATENT OFFICE.

LOUIS JOSEPH CEREGHINO, OF ALAMEDA, CALIFORNIA.

COMBINED FLYTRAP AND GARBAGE-CAN.

1,350,402.   Specification of Letters Patent.   Patented Aug. 24, 1920.

Application filed December 4, 1916. Serial No. 134,933.

*To all whom it may concern:*

Be it known that I, LOUIS JOSEPH CEREGHINO, a citizen of the United States, residing at Alameda, in the county of Alameda and State of California, have invented certain new and useful Improvements in Combined Flytraps and Garbage-Cans, of which the following is a specification.

This invention is an improved fly trap. One of the objects of the invention is to provide a flytrap so constructed as to effect an improvement in sanitary conditions, by providing means by which flies are induced to enter a trap directly connected with a favorite gathering and breeding place, *i. e.*, a garbage can.

The invention will be hereinafter fully set forth and particularly pointed out in the claims.

Figure 1:
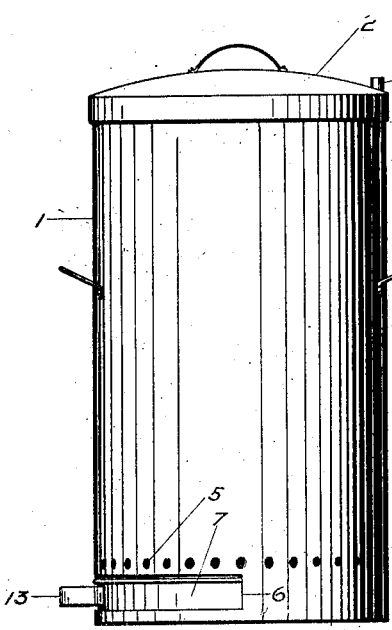
Figure 2:
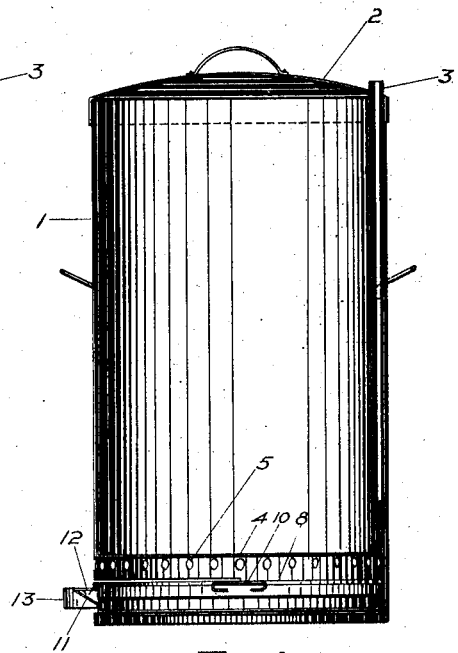
Figure 3:
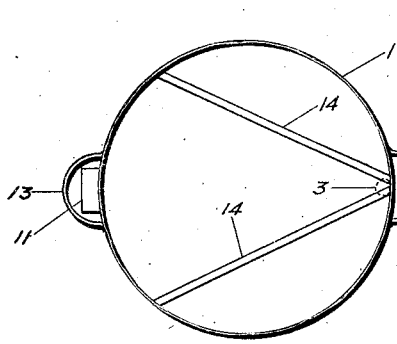
Figure 4:
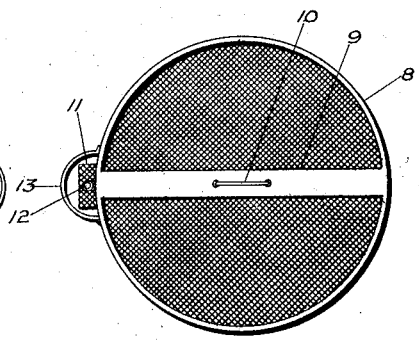
Figures 5, 6:
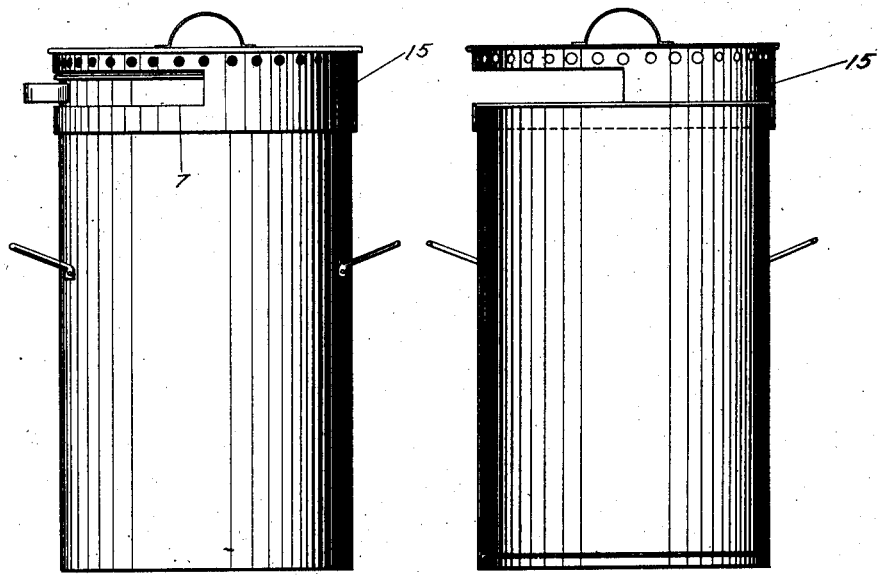
Figures 7, 8:
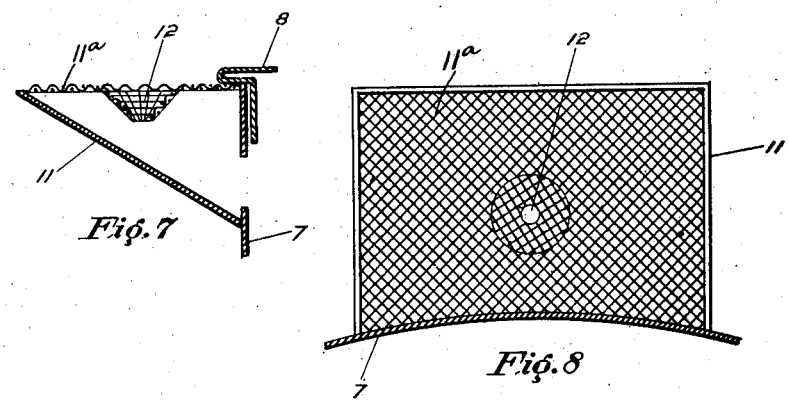

In the accompanying drawings:

Figure 1 shows a side view of a garbage can with the fly trap located at the bottom of the can. Fig. 2 shows a sectional elevation of the same. Fig. 3 is a bottom view of the can. Fig. 4 is a top view of the fly trap. Fig. 5 shows a side view of a garbage can in which the fly trap is embodied in the cover. Fig. 6 is a sectional elevation of the can as shown in Fig. 5. Fig. 7 is a sectional elevation of the spout which forms the entrance to the fly trap. Fig. 8 shows a top view of the spout.

Referring to the drawing, 1 designates a garbage can, equipped with a cover 2, provided with a hole into which fits tube 3, which, as shown in Fig. 2, extends to within a few inches of bottom 4. Tube 3 serves the purpose of conveying some suitable disinfectant, such as chlorid of lime, to the seepage of the garbage, thereby rendering the use of disinfectants more efficient and economical. The bottom 4 is spaced above the lower edge of the wall of the can, as shown in Fig. 2 forming a fly trap chamber below said bottom.

An opening 6, is formed in the wall of can 1, below bottom 4, to admit a flat pan 7, provided with handle 13, inclosing a spout 11, a detail of which is shown in Figs. 7 and 8. Pan 7 is fitted with a screen cover 8 provided with a strip of metal 9 to which is attached a handle 10. Cover 8 is removable, to permit the placing of some bait, such as a pinch of sugar or a flat saucer of stale beer, within pan 7, and to facilitate the removal of dead flies. Spout 11 has a covering 11ª of wire netting, having a funnel shaped opening 12. Flies, upon entering the trap in search of food, are attracted by the light, admitted through holes 5, in the side wall of can 1, and will attempt to escape through the screened cover 8 and fail to locate opening 12. The pan 7 is supported by strips 14, attached in the wall of the can in suitable manner.

In the combination, as illustrated in Fig. 6, the pan or trap is located within the removable cover 15, which provides a suitable chamber therefor. Except for change of position, the principle and manner of construction are identical to the above described combination.

Having thus explained the nature of the invention, and described an operative manner of constructing and using the same, although without attempting to set forth all of the forms in which it may be made, or all of the forms of its use, the following is claimed:

1. A device of the character described comprising a casing forming a chamber, a pan located within said chamber, and provided with a screen-covered spout having an inlet opening therein, and a removable screen cover for said pan.

2. A device of the character described comprising a casing forming a chamber, a pan located within said chamber, and provided with a screen-covered spout having an inlet opening therein, a removable screen cover for said pan, and strips attached to the wall of said chamber and supporting said pan.

3. A device of the character described comprising a casing forming a chamber, a pan located within said chamber, and provided with a screen-covered spout having an inlet opening therein, a removable screen cover for said pan, said chamber having light openings above the plane of said pan.

4. A device of the character described comprising a casing forming a chamber, said chamber having an opening at one side, a pan located within said chamber and provided with a spout having an inlet opening therein, said pan being removable through said opening, a handle extending around said spout, and a screen cover for said pan.

5. The combination with a receptacle having means for providing a chamber separated from the interior of the receptacle, of a pan located within said chamber, and provided with a screen-covered spout having an inlet opening therein, and a removable screen cover for said pan.

6. In combination, a receptacle formed with a chamber below its bottom wall, said chamber being provided with a side opening, supporting means within said chamber, a pan adapted to slide through said opening and rest within said chamber upon said supporting means, said chamber being provided with inlets above the top of said pan, a screen covering the top of said pan, a screen-covered spout adapted to extend through said side opening, said screen-covered spout being provided with an inlet.

7. In combination, a chamber, provided with a side opening and inlets, supporting means in said chamber, a pan adapted to slide through said opening and rest within said chamber upon said supporting means below said inlets, a screen covering the top of said pan, a screen-covered spout adapted to extend through said side opening, said screen-covered spout being provided with an inlet.

In testimony whereof I affix my signature.

LOUIS JOSEPH CEREGHINO.